US008347619B2

(12) United States Patent
Kim

(10) Patent No.: US 8,347,619 B2
(45) Date of Patent: Jan. 8, 2013

(54) SYSTEM AND METHOD OF CONTROLLING TORQUE OF PLURAL VARIABLE DISPLACEMENT HYDRAULIC PUMPS

(75) Inventor: Dong Soo Kim, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 897 days.

(21) Appl. No.: 12/471,709

(22) Filed: May 26, 2009

(65) Prior Publication Data

US 2009/0293468 A1 Dec. 3, 2009

(30) Foreign Application Priority Data

Jun. 3, 2008 (KR) ........................ 10-2008-0052098

(51) Int. Cl.
*F16D 31/02* (2006.01)

(52) U.S. Cl. ............................. 60/428; 60/431; 417/216

(58) Field of Classification Search .................... 60/428, 60/430, 431; 417/216, 429
See application file for complete search history.

(56) References Cited

U.S. PATENT DOCUMENTS 5,951,258 A * 9/1999 Lueschow et al. .............. 417/22

* cited by examiner

*Primary Examiner* — F. Daniel Lopez
(74) *Attorney, Agent, or Firm* — Ladas & Parry LLP

(57) ABSTRACT

A system and method of controlling torque of plural variable displacement hydraulic pumps in construction equipment are provided, which can control torque of the variable displacement hydraulic pumps so that the total amount of torque of the hydraulic pumps does not exceed the preset amount of torque by presetting the torque so that the engine does not stop even at maximum load of the hydraulic pumps or by presetting the speed of the engine or the used torque of the hydraulic pumps in consideration of the fuel economy or working speed. The system includes an engine, at least two variable displacement hydraulic pumps, hydraulic actuators, control levers generating manipulation signals, control lever sensing means detecting the manipulation amounts of the control levers, hydraulic pump pressure sensing means detecting load pressures of the hydraulic pumps, maximum torque setting means setting the total torque inputted to the hydraulic pumps, desired flow rate computing means computing flow rates of the hydraulic pumps, expected torque computing means computing expected torque values of the hydraulic pumps, torque distributing means distributing torque values of the hydraulic pumps, limited flow rate computing means computing the flow rates of the hydraulic pumps, and output means outputting control signals to regulators.

10 Claims, 7 Drawing Sheets

SYSTEM AND METHOD OF CONTROLLING TORQUE OF PLURAL VARIABLE DISPLACEMENT HYDRAULIC PUMPS

CROSS-REFERENCE TO RELATED APPLICATION

This application is based on and claims priority from Korean Patent Application No. 10-2008-0052098, filed on Jun. 3, 2008 in the Korean Intellectual Property Office, the disclosure of which is incorporated herein in its entirety by reference.

BACKGROUND OF THE INVENTION

1. Field of the Invention

The present invention relates to a system and method of controlling torque of plural variable displacement hydraulic pumps in construction equipment that drives working devices by operating an engine and the plural variable displacement hydraulic pumps associated with the engine, which can make it possible to use all the set amount of torque regardless of the load pressure or the number of hydraulic pumps.

More particularly, the present invention relates to a system and method of controlling torque of plural variable displacement hydraulic pumps in construction equipment that operates the plural variable displacement hydraulic pumps by an engine, which can control torque of the variable displacement hydraulic pumps so that the total amount of torque of the hydraulic pumps does not exceed the preset amount of torque by presetting the torque so that the engine does not stop even at maximum load of the hydraulic pumps or by presetting the speed of the engine or the used torque of the hydraulic pumps in consideration of the fuel economy or working speed.

2. Description of the Prior Art

A conventional torque limiting control system for a hydraulic work machine is disclosed in U.S. Pat. No. 5,951,258. The conventional torque limiting system, which is also called an apparatus for controlling an electrohydraulic system of a work machine having an engine that drives variable displacement pumps, includes a pump displacement setting device 125 adapted to produce a pump command signal indicative of a desired displacement of the variable displacement pumps 115 and 120; pressure sensors 130 and 131 adapted to detect the fluid pressure associated with the variable displacement pumps 115 and 120 and produce a pressure signal indicative of the detected fluid pressure; an engine speed sensor 140 adapted to detect the speed of the engine 110 and produce an actual engine speed signal indicative of the detected engine speed; torque computing means 205 receiving the pump command and pressure signals of the variable displacement pumps 115 and 120, responsively computing the torque demand on the engine 110, and producing a torque demand signal; torque limiting means 210 receiving the torque demand and engine speed signals, responsively determining a torque limit associated with the engine 110, and producing a specified torque limit signal; and a scaling means 225 receiving the pump command and torque limit signals, determining a scaling factor, and modifying the pump command signal in response to the scaling factor to govern the engine torque.

In the case of scaling the flow rate by using the ratio of an expected torque to the limited torque in the torque limiting control system for a hydraulic work machine, the efficiency of the pump torque in the modified flow rate differs from the efficiency of the pump torque when the expected torque is calculated before the flow rate is modified, and thus the torque limit of the basically causes error occurrence.

Also, there is a limit to individual torque limiting for the plural hydraulic pumps.

In the case of mechanically limiting the torque of the pumps in the conventional torque limiting control apparatus for mechanical variable displacement pumps as illustrated in FIG. 1, the torque limiting mechanism is constructed by a mechanical combination, and thus the maximum torque set for the whole pressure regions cannot be used due to the limitation of the mechanical characteristic even for a single hydraulic pump (In FIG. 1, “a” denotes the flow rate per pressure for the mechanical torque limit, and “b” denotes the ideal flow rate per pressure for a constant torque value).

Also, in the case of performing cross-sensing torque control of plural pumps, the corresponding construction is complicated, and it becomes impossible to use the total amount of torque or 100% of the set torque of the respective pumps.

Also, in compliance with the market requirements, such as fuel economy improvement of the construction equipment, implementation of electronic functions of construction equipment in diverse working environments, and the like, it becomes immediate to adopt electronic hydraulic pumps.

Even in the case of controlling fuel injection to the engine for urgent load, the delay of the engine itself occurs, and the increase of the engine torque is limited by limiting the fuel injection ratio in order to reduce black smoke in compliance with the waste gas regulation.

In addition, trouble may occur in torque matching due to the year elapse of the engine or pumps. That is, in the case of urgent load of the engine, the engine may instantaneously stop or the engine speed may be excessively reduced to cause the output horsepower (hp) of the pumps to be reduced. Also, even in a static state, trouble may occur in torque matching, and in this case, an excessive lowering of engine revolution may continuously occur.

SUMMARY OF THE INVENTION

Accordingly, the present invention has been made to solve the above-mentioned problems occurring in the prior art while advantages achieved by the prior art are maintained intact.

One object of the present invention is to provide a system and method of controlling torque of plural variable displacement hydraulic pumps in construction equipment that operates the plural variable displacement hydraulic pumps associated with an engine, which can accurately limit the total amount of torque of the hydraulic pumps to the preset amount of torque when the used torque of the hydraulic pumps is limited.

Another object of the present invention is to provide a system and method of controlling torque of plural variable displacement hydraulic pumps, which can maintain user manipulation according to a user’s intention even on the torque limit condition by reducing the flow rate of the respective hydraulic pumps in the specified ratio with respect to the desired flow rate of the respective hydraulic pumps in the case where the sum of desired torque values of the plural hydraulic pumps is larger than a set torque value and thus it is intended to reduce the discharge flow rate of the respective hydraulic pumps.

Still another object of the present invention is to provide a system and method of controlling torque of plural variable displacement hydraulic pumps, which can improve the workability by suppressing the stop of engine start during the occurrence of urgent load on condition that load is generated in the plural hydraulic pumps, and can maintain the working speed by preventing an excessive speed lowering of an engine during the occurrence of urgent load.

Still another object of the present invention is to provide a system and method of controlling torque of plural variable displacement hydraulic pumps, which can suppress unexpected generation of vibration in working devices even in their abrupt operation through adjustment of the change rate of the torque of the plural hydraulic pumps.

In order to accomplish these objects, there is provided a system for controlling torque of plural variable displacement hydraulic pumps, according to an embodiment of the present invention, which includes an engine; at least two variable displacement hydraulic pumps associated with the engine; hydraulic actuators associated with the hydraulic pumps, respectively, to drive working devices; control levers generating manipulation signals corresponding to manipulation amounts to drive the hydraulic actuators, respectively; control lever sensing means detecting the manipulation amounts of the control levers and generating detection signals; hydraulic pump pressure sensing means detecting load pressures of the hydraulic pumps and generating detection signals; maximum torque setting means setting the total torque inputted from the engine to the hydraulic pumps; desired flow rate computing means computing flow rates of the hydraulic pumps corresponding to the detection signals inputted from the control lever sensing means; expected torque computing means computing expected torque values of the hydraulic pumps in accordance with input signals from the hydraulic pump pressure sensing means and the desired flow rate computing means; torque distributing means distributing torque values of the hydraulic pumps by proportionally reducing allowable torque values of the hydraulic pumps so that the sum of the torque values generated by the hydraulic pumps is limited to the torque value by the maximum torque setting means in accordance with input signals from the expected torque computing means and the maximum torque setting means; limited flow rate computing means receiving the torque values of the hydraulic pumps distributed by the torque distributing means and the load pressures of the hydraulic pumps from the hydraulic pump pressure sensing means, and computing the flow rates of the hydraulic pumps so that the torque values reset in accordance with the load pressures generated by the hydraulic pumps are generated in the hydraulic pumps; and output means outputting control signals to regulators so that the hydraulic pumps are operated in accordance with the flow rates computed by the limited flow rate computing means.

In another aspect of the present invention, there is provided a method of controlling torque of plural variable displacement hydraulic pumps in construction equipment including an engine, plural variable displacement hydraulic pumps associated with the engine, hydraulic actuators associated with the hydraulic pumps, control levers generating manipulation signals so as to drive the hydraulic actuators, control lever sensing means detecting the manipulation amounts of the control levers, pressure sensing means detecting load pressures of the hydraulic pumps, and torque selecting means, which includes a first step of receiving inputs of the manipulation amounts of the control levers from the control lever sensing means, the load pressures of the hydraulic pumps from the pressure sensing means, and a torque value selected by the torque selection means; a second step of setting the total torque inputted to the hydraulic pumps in accordance with a selected value selected by the torque selection means; a third step of computing desired flow rates of the hydraulic pumps desired in accordance with the manipulation amounts of the control levers; a fourth step of computing expected torque values of the hydraulic pumps from the desired flow rates of the hydraulic pumps and the load pressures of the hydraulic pumps; a fifth step of judging whether the sum of the expected torque values of the hydraulic pumps is larger than the set maximum torque value; a sixth step of outputting the desired flow rates to the hydraulic pumps as they are if the sum of the expected torque values of the hydraulic pumps is smaller than the set maximum torque value in the fifth step; and a seventh step of outputting the desired flow rates of the hydraulic pumps reset so that the sum of the torque values of the hydraulic pumps is limited to the distributed torque values of the hydraulic pumps in accordance with load pressure conditions of the hydraulic pumps if the sum of the expected torque values of the hydraulic pumps is larger than the set maximum torque value in the fifth step.

The seventh step may proportionally reduce the respective maximum torque values of the hydraulic pumps so as to limit the torque values of the hydraulic pumps to the set maximum torque values.

The maximum torque setting means may modify the maximum torque values by comparing an input engine speed with a set engine speed.

The maximum torque setting means may receive the expected torque values and modify the maximum torque values so that the change rate of the sum of the distributed torque values exists within a specified range.

The maximum torque setting means may receive the input signals from the manipulation amount sensing means, and if it is judged that no manipulation amount is detected, it may maintain the maximum torque value lower than the set maximum torque value, while if any manipulation amount of the control levers is detected, it may modify the maximum torque value so that the maximum torque value is gradually increased for a predetermined time.

The torque distributing means may reset the respective distributed torque values so that the change rate of the distributed torque values of the hydraulic pumps exists within a specified range.

If the distributed torque values of the hydraulic pumps reach upper and lower threshold values of torque use of the hydraulic pumps, the torque distributing means may set the torque value of the corresponding hydraulic pump as a threshold value and transfer its variation to the remaining hydraulic pump to reset the torque value.

Pressure sensors may be used as the hydraulic pump pressure sensing means.

The maximum torque setting means may include an engine speed setting function that sets the maximum torque values of the hydraulic pumps in association with an engine speed adjusting step so as to adjust the working speed through setting of the engine speed in multi-steps.

BRIEF DESCRIPTION OF THE DRAWINGS

The above and other objects, features and advantages of the present invention will be more apparent from the following detailed description taken in conjunction with the accompanying drawings, in which.

DETAILING DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
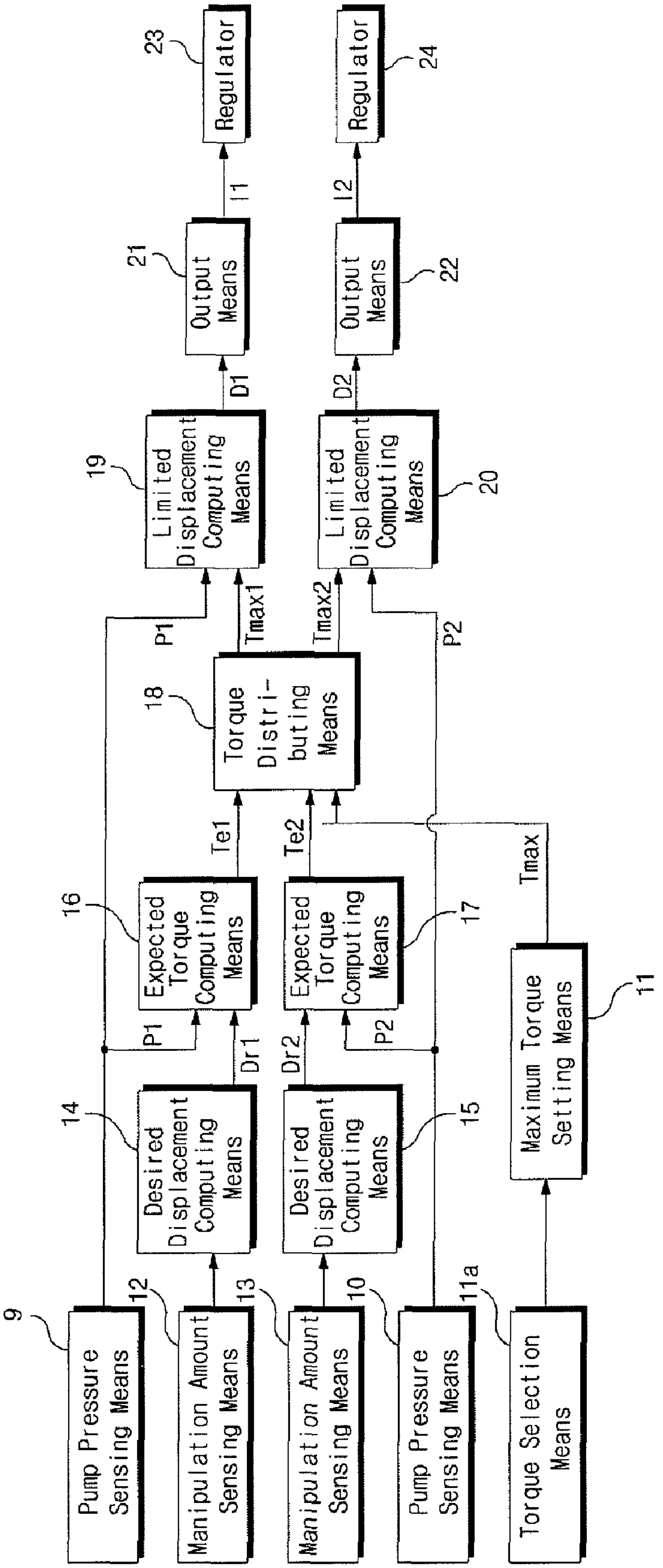
FIG. 3 is a block diagram illustrating the configuration of a system for controlling torque of plural variable displacement hydraulic pumps according to an embodiment of the present invention.
Figure 4:
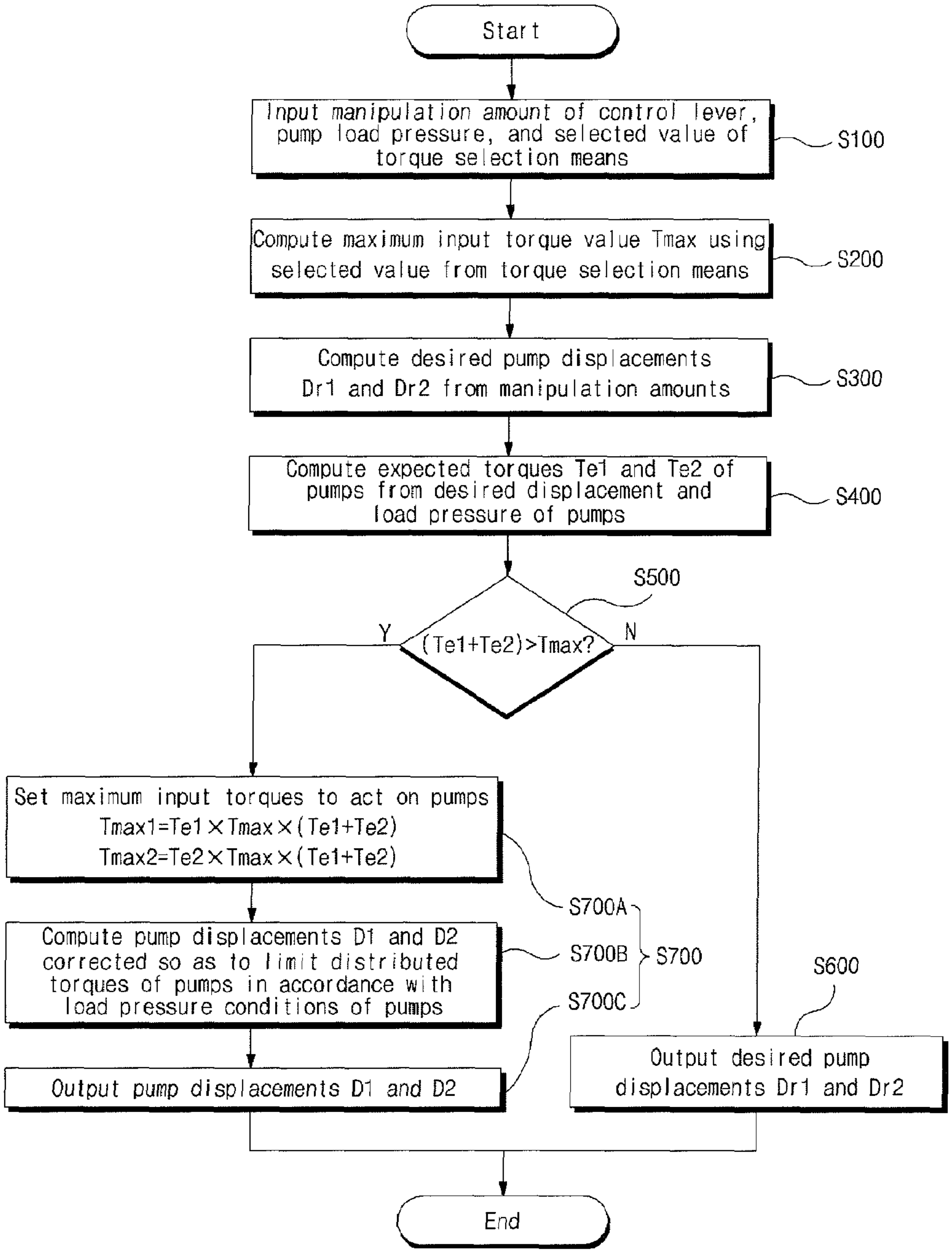
FIG. 4 is a flowchart illustrating a method of controlling torque of plural variable displacement hydraulic pumps according to an embodiment of the present invention.

As illustrated in FIGS. 3 and 4, a system for controlling torque of plural variable displacement hydraulic pumps in construction equipment according to an embodiment of the present invention includes an engine 1; at least two variable displacement hydraulic pumps (hereinafter referred to as "hydraulic pumps") 2 and 3 associated with the engine 1; hydraulic actuators (e.g. hydraulic cylinders) 5 and 6 associated with the hydraulic pumps 2 and 3, respectively, to drive working devices (a boom, an arm, and the like); control levers (i.e. RCV levers) 7 and 8 generating manipulation signals corresponding to manipulation amounts to drive the hydraulic actuators 5 and 6, respectively; control lever manipulation amount sensing means 12 and 13 detecting the manipulation amounts of the control levers 7 and 8 and generating detection signals; hydraulic pump pressure sensing means 9 and 10 detecting load pressures of the hydraulic pumps 2 and 3 and generating detection signals; maximum torque setting means 11 setting the total torque inputted from the engine 1 to the hydraulic pumps 2 and 3; desired flow rate computing means 14 and 15 computing flow rates of the hydraulic pumps 2 and 3 corresponding to the detection signals inputted from the control lever sensing means 12 and 13; expected torque computing means 16 and 17 computing expected torque values of the hydraulic pumps 2 and 3 in accordance with input signals from the hydraulic pump pressure sensing means 9 and 10 and the desired flow rate computing means 14 and 15; torque distributing means 18 distributing torque values of the hydraulic pumps 2 and 3 by proportionally reducing allowable torque values of the hydraulic pumps 2 and 3 so that the sum of the torque values generated by the hydraulic pumps 2 and 3 is limited to the torque value by the maximum torque setting means 11 in accordance with input signals from the expected torque computing means 16 and 17 and the maximum torque setting means 11; limited flow rate computing means 19 and 20 receiving the torque values of the hydraulic pumps 2 and 3 distributed by the torque distributing means 18 and the load pressures of the hydraulic pumps 2 and 3 from the hydraulic pump pressure sensing means 9 and 10, and computing the flow rates of the hydraulic pumps 2 and 3 so that the torque values reset in accordance with the load pressures generated by the hydraulic pumps 2 and 3 are generated in the hydraulic pumps 2 and 3; and output means 21 and 22 outputting control signals to regulators 23 and 24 so that the hydraulic pumps 2 and 3 are operated in accordance with the flow rates computed by the limited flow rate computing means 19 and 20.

In the drawings, the reference numerals 23 and 24 denote regulators respectively controlling inclination angles of swash plates of the hydraulic pumps 2 and 3 in accordance with the input of drive signals, 25 denotes a pilot pump supplying pilot signal pressure, 26 denotes a controller, 27 and 28 denote main control valves controlling the flow rate and direction of hydraulic fluid being supplied from the hydraulic pumps 2 and 3 to the hydraulic actuators 5 and 6 in accordance with the pilot signal pressure inputted corresponding to the control levers 7 and 8, and 30 and 31 denote electro proportional valves controlling the signal pressure being applied to the regulators 23 and 24 in accordance with a control signal from the controller 26.

Figure 5:
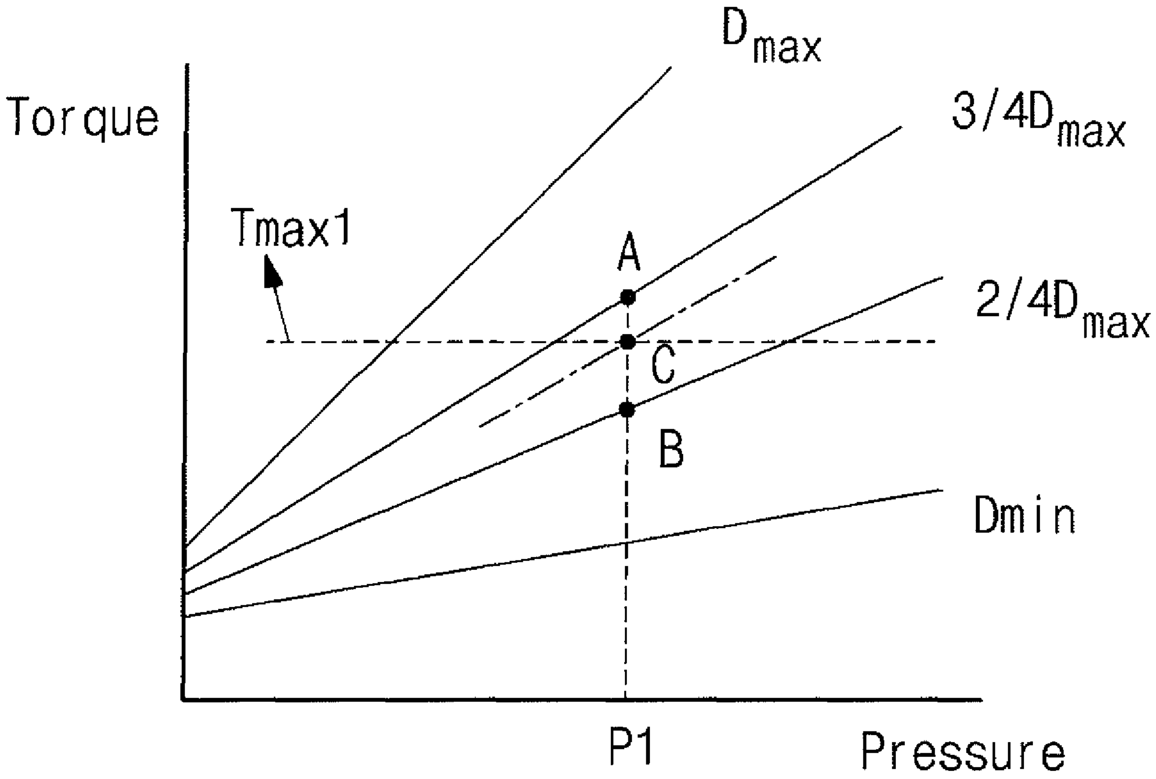
FIG. 5 is a graph representing experimental torque values against the pressure and displacement of the hydraulic pump.

As illustrated in FIG. 5, a method of controlling torque of plural variable displacement hydraulic pumps in construction equipment including an engine 1, plural variable displacement hydraulic pumps 2 and 3 associated with the engine 1, hydraulic actuators 5 and 6 associated with the hydraulic pumps 2 and 3, control levers 7 and 8 generating manipulation signals corresponding to their manipulation amounts to drive the hydraulic actuators 5 and 6, control lever sensing means 12 and 13 detecting the manipulation amounts of the control levers 7 and 8, pressure sensing means 9 and 10 detecting load pressures of the hydraulic pumps 2 and 3, and torque selecting means 11*a*, includes a first step S100 of receiving inputs of the manipulation amounts of the control levers 7 and 8 from the control lever sensing means 12 and 13, the load pressures of the hydraulic pumps 2 and 3 from the pressure sensing means 9 and 10, and a torque value selected by the torque selection means 11*a*; a second step S200 of setting the total torque Tmax inputted to the hydraulic pumps 2 and 3 in accordance with a selected value selected by the torque selection means 11*a*; a third step S300 of computing desired displacements Dr1 and Dr2 of the hydraulic pumps 2 and 3 desired in accordance with the manipulation amounts of the control levers 7 and 8; a fourth step S400 of computing expected torque values Te1 and Te2 of the hydraulic pumps 2 and 3 from the desired displacements Dr1 and Dr2 of the hydraulic pumps 2 and 3 and the load pressures of the hydraulic pumps 2 and 3; a fifth step S500 of judging whether the sum Te1+Te2 of the expected torque values of the hydraulic pumps 2 and 3 is larger than the set maximum torque value Tmax; a sixth step S600 of outputting the desired displacements Dr1 and Dr2 of the hydraulic pumps 2 and 3 as they are if the sum Te1+Te2 of the expected torque values of the hydraulic pumps 2 and 3 is smaller than the set maximum torque value Tmax (i.e. (Te1+Te2)<Tmax) in the fifth step S500; and a seventh step S700 of outputting the desired displacements D1 and D2 of the hydraulic pumps 2 and 3 reset so that the sum of the torque values of the hydraulic pumps 2 and 3 is limited to the distributed torque values of the hydraulic pumps 2 and 3 in accordance with load pressure conditions of the hydraulic pumps 2 and 3 if the sum Te1+Te2 of the expected torque values of the hydraulic pumps 2 and 3 is larger than the set maximum torque value Tmax (i.e. (Te1+Te2)>Tmax) in the fifth step S500.

Hereinafter, the system and method of controlling torque of plural variable displacement hydraulic pumps according to an embodiment of the present invention will be described in detail with reference to the accompanying drawings.

Figure 1:
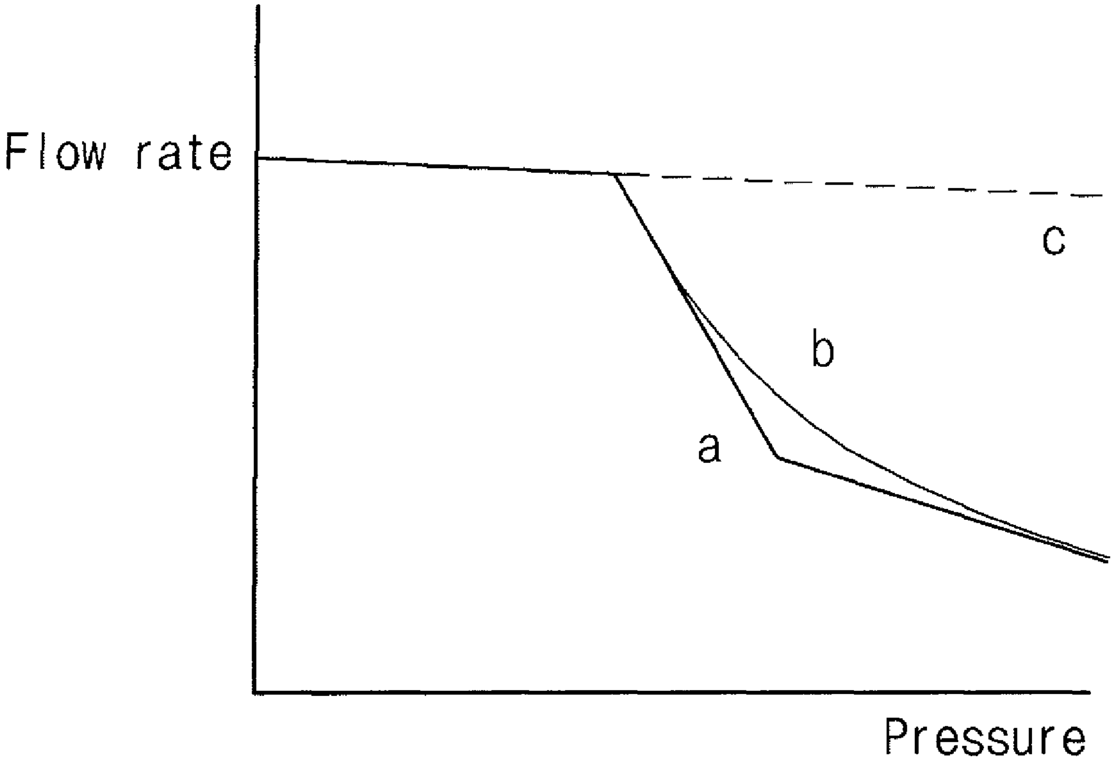
Fig. 1 Prior Art
FIG. 1 is a graph representing the torque limiting characteristic of a conventional mechanical variable displacement hydraulic pump.
Figure 2:
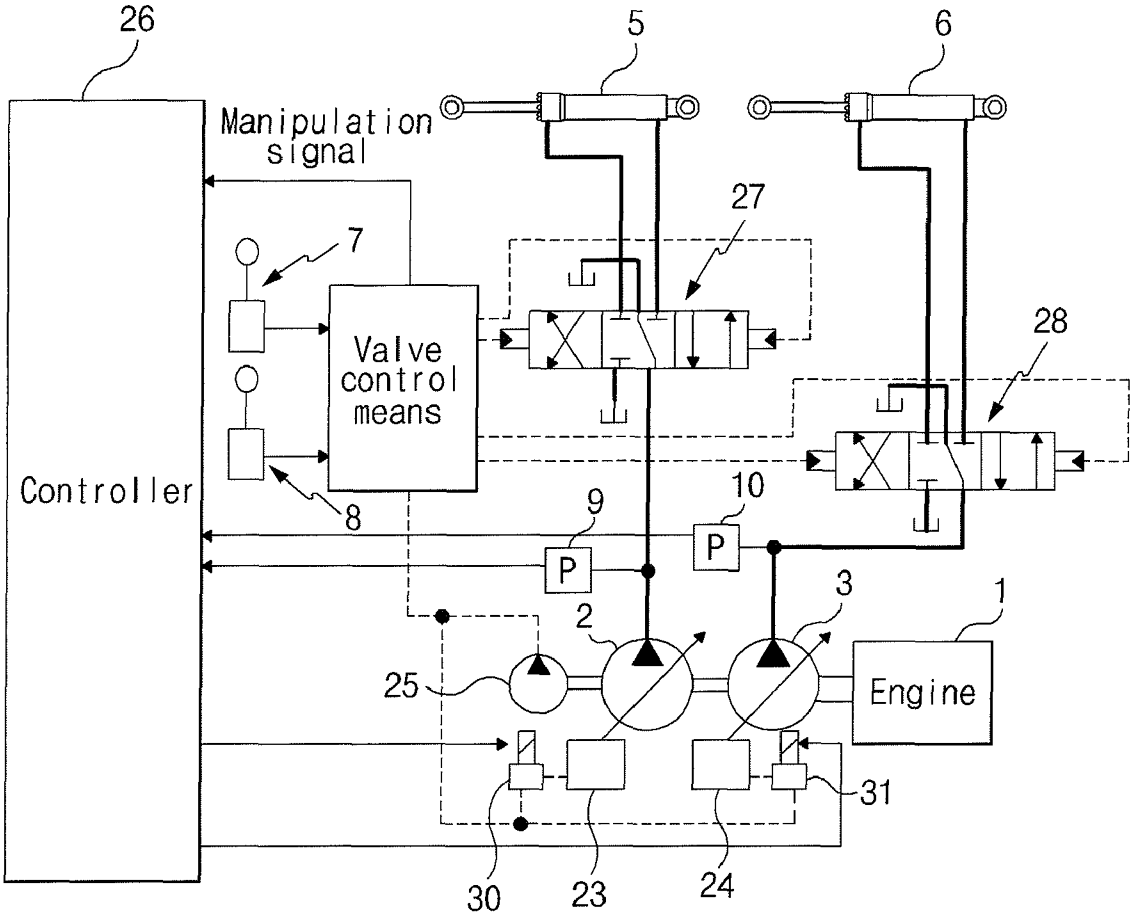
FIG. 2 is a schematic hydraulic circuit diagram used in a system for controlling torque of plural variable displacement hydraulic pumps according to an embodiment of the present invention.

As illustrated in FIG. 2, in the case where the control levers 7 and 8 are manipulated by a user, pilot signal pressure that corresponds to the manipulation amounts of the control levers is supplied from the pilot pump 25 to the main control valves 27 and 28 to shift inner spools.

Accordingly, hydraulic fluid discharged from the variable displacement hydraulic pumps 2 and 3 is supplied to the hydraulic cylinders 5 and 6 through the control valves 27 and 28, and thus working devices such as a boom and so on are driven.

Also, the secondary pressure passing through the control levers 7 and 8 from the pilot pump 25, which corresponds to the manipulation amounts of the control levers 7 and 8, is supplied to the regulators 23 and 24 through the electro proportional valves 30 and 31. Accordingly, the inclination angles of the swash plates of the hydraulic pumps 2 and 3 are controlled to optimize the discharge flow rate.

As illustrated in FIGS. 3 to 5, the manipulation amounts of the control levers 7 and 8 from the control lever sensing means 12 and 13, the load pressures of the hydraulic pumps 2 and 3 from the pressure sensing means 9 and 10, and the torque value selected by the torque selection means 11*a* are inputted (step S100).

The total torque Tmax inputted to the hydraulic pumps 2 and 3 is set in accordance with the selected value selected by the torque selection means 11*a* (step S200). In this case, the torque selection means 11*a* is used to set the working speed in addition to the setting of the engine speed.

The engine speed set in accordance with the value selected by the torque selection means 11*a* is outputted to the engine 1, and preset values of input torques of the hydraulic pumps 2 and 3 to be used in a set speed range are stored in a memory of the controller 26 to compute the torque values corresponding to the selected value.

Desired displacements Dr1 and Dr2 of the hydraulic pumps 2 and 3 are computed in accordance with the manipulation amounts of the control levers 7 and 8 outputted from the control lever manipulation amount sensing means 12 and 13 (step S300).

The desired displacements Dr1 and Dr2 of the hydraulic pumps 2 and 3 and the load pressures of the hydraulic pumps 2 and 3 from the hydraulic pump pressure sensing means 9 and 10 are inputted, and expected torques Te1 and Te2 of the hydraulic pumps 2 and 3 are computed (step S400).

The expected torque Te1 of the hydraulic pump 2 is Te1=K1×P1×Dr1, and the expected torque Te2 of the hydraulic pump 3 is Te2=K2×P2×Dr2.

Here, Ki is Ki=fi(P,Dr) (an expected torque constant according to pressure and displacement).

That is, Te=(Te1+Te2).

Tmax indicates the maximum torque set by the torque setting means 11. Generally, the working speed is adjusted by setting the engine speed in multi-steps, and the maximum torque of the hydraulic pumps is set in association with the engine speed adjusting step.

Then, it is judged whether the sum (Te=(Te1+Te2)) of the expected torque values of the hydraulic pumps 2 and 3 is larger than the set maximum torque value Tmax (step S500).

If the sum (Te=(Te1+Te2)) of the expected torque values of the hydraulic pumps 2 and 3 is smaller than the set maximum torque value Tmax (i.e. (Te1+Te2)<Tmax ), the output means 21 and 22 output the desired displacements Dr1 and Dr2 of the hydraulic pumps 2 and 3 to the regulators 23 and 24 as they are (step S600).

If the sum (Te=(Te1+Te2)) of the expected torque values of the hydraulic pumps 2 and 3 is larger than the set maximum torque value Tmax (i.e. (Te1+Te2)>Tmax ), the output means 21 outputs the desired displacements D1 and D2 of the hydraulic pumps 2 and 3 reset so that the sum of the torque values of the hydraulic pumps 2 and 3 is limited to the distributed torque values of the hydraulic pumps 2 and 3 in accordance with load pressure conditions of the hydraulic pumps 2 and 3 (step S700).

As in step S700A, the maximum torques of the hydraulic pumps 2 and 3 are proportionally reduced.

The maximum input torque to act on the hydraulic pump 2 is Tmax1=(Te1×Tmax)/Te(Te=Te1+Te2), and the maximum input torque to act on the hydraulic pump 3 is Tmax2=(Te2×Tmax)/Te(Te=Te1+Te2).

That is, Tmax=(Tmax1+Tmax2).

Accordingly, the sum (Tmax=(Tmax1+Tmax2)) of the torques distributed to the hydraulic pumps 2 and 3 is kept at the torque limit value Tmax, the torque matching of the engine 1 and the hydraulic pumps 2 and 3 is achieved.

Then, as in step S700B, P1 value is confirmed with respect to the maximum input torque Tmax1 of the hydraulic pump 2, and specified displacement, which corresponds to the maximum input torque Tmax1 in a formula or a table, is confirmed. In this case, the table is provided by experimentally obtaining a torque value for pressure and displacement.

As illustrated in FIG. 5, it is assumed that input torque data of the hydraulic pumps 2 and 3 for setting four kinds of displacements has been provided. If Tmax is determined, the displacement of "C" value is searched for by linear interpolation using torque values A and B for the displacement of ¾ and 2/4 Dmax at the corresponding pressure. If experimental torque values are provided for more diverse displacements, the degree of computation can be heightened.

If it is assumed that three variable displacement hydraulic pumps P1, P2, and P3 are used, the expected torque Te1 of the hydraulic pump P1 is Te1=(K1×P1×Dr1), the expected torque Te2 of the hydraulic pump P2 is Te2=(K2×P2×Dr2), and the expected torque Te3 of the hydraulic pump P3 is Te3=(K3×P3×Dr3).

That is, the sum Te of the expected torques of the hydraulic pumps P1, P2, and P3 becomes Te=(Te1+Te2+Te3).

At this time, if the sum Te of the expected torques of the hydraulic pumps P1, P2, and P3 is larger than the set maximum torque Tmax (i.e. Te(=Te1+Te2+Te3)>Tmax ), the set torque values of the respective hydraulic pumps P1, P2, and P3 are distributed in such a manner that the maximum input torque to act on the hydraulic pump P1 becomes Tmax1=(Te1×Tmax)/Te(=Te1+Te2+Te3), the maximum input torque to act on the hydraulic pump P2 becomes Tmax2=(Te2×Tmax)/Te(=Te1+Te2+Te3), and the maximum input torque to act on the hydraulic pump P3 becomes Tmax3=(Te3×Tmax)/Te(=Te1+Te2+Te3).

By contrast, if Tmax1 among the distributed torque values is smaller than the torque value for the minimum displacement at the present load pressure, the actual displacement cannot be lowered any further. Accordingly, Tmax1 is set to Tmin, which has a minus value at Tmax, and the scaling is performed again in the remaining hydraulic pumps to distribute the torques.

Also, if it is assumed that the set Tmax1 exceeds the mechanical limit of the hydraulic pump, Tmax1 is set to the limit value, which has a minus value at Tmax, and the scaling is performed again in the remaining hydraulic pumps to distribute the torques.

In the case of using more than three hydraulic pumps, the total allowable torque, which is limited for each hydraulic pump, is relatively small in comparison to Tmax, and thus the torque of a specified hydraulic pump should be often limited even if the sum of the expected torques does not exceed Tmax. In this case, it is first checked whether the torque of the respective hydraulic pump exceeds the allowable torque, and if the torque of the hydraulic pump exceeds the allowable torque, the torque of the corresponding hydraulic pump is set to the allowable torque, which has a minus value at the total torque, and the torques are distributed to the remaining hydraulic pumps in the same manner.

As described above, by proportionally reducing the distributed torques of the hydraulic pumps with respect to the total limit torque, the speeds of the respective working devices are proportionally reduced according to a user's intention in a region where the variation of the efficiency of the hydraulic pumps is not large. That is, the relative speeds of the respective working devices can be harmonized.

If it is intended to give different priorities to the respective working devices for the maximum manipulation amount of the manipulation means while the working devices are simultaneously manipulated, the flow rates of the hydraulic pumps and valves for the manipulation amounts are differently set.

For example, in the case where the priorities of the working devices are not separately designated and the manipulation means of two working devices are simultaneously manipulated at maximum, the preferable maximum flow rates for individual operations of the working devices are set as the maximum flow rates of the respective hydraulic pumps.

By contrast, in the case where the priorities of the working devices are designated, a relatively high flow rate may be mapped for the manipulation amount of one working device in the order of priority, or a relatively low flow rate may be mapped for the manipulation amount of the other working device. In this case, by applying the method of controlling torque of hydraulic pumps according to an embodiment of the present invention thereto, the discharge flow rates of the hydraulic pumps in consideration of the priorities of the working devices can be achieved during the torque limiting.

For example, even in the case of limiting the torque of a working device connected to the hydraulic pump 2 while working devices designated to the respective hydraulic pumps are simultaneously operated at maximum, the flow rate for the working device designated to the hydraulic pump 2 can be set to be twice the flow rate for the working device designated to the hydraulic pump 3 in response to the following equations to limit the torques.

$$Te1=K1\times P1\times Dr1(=2\times D\text{max}),$$

$$Te2=K2\times P2\times Dr2(=D\text{max}),$$

$$Te=(Te1+Te2),$$

$$T\text{max}1=(Te1\times T\text{max})/Te(=Te1+Te2),\text{ and}$$

$$T\text{max}2=(Te2\times T\text{max})/Te(=Te1+Te2).$$

That is, the torque value Tmax1 becomes twice the torque value Tmax2 after the application of the priority function, and thus the priority function is maintained as it is even in the case of limiting the torque.

As described above, in the case of limiting the torques of the hydraulic pumps so that the priority function for setting the flow rates of valves of the respective working devices and for setting the corresponding flow rates of the hydraulic pumps can be implemented in the valve controller, the priority function can be implemented in diverse manners only through computation of desired flow rates of the valves or hydraulic pumps in diverse flow rate limiting states, even without separate correction of the hydraulic pump control. Even in a static state, the torque matching of the engine and the hydraulic pumps can be achieved.

Figure 6:
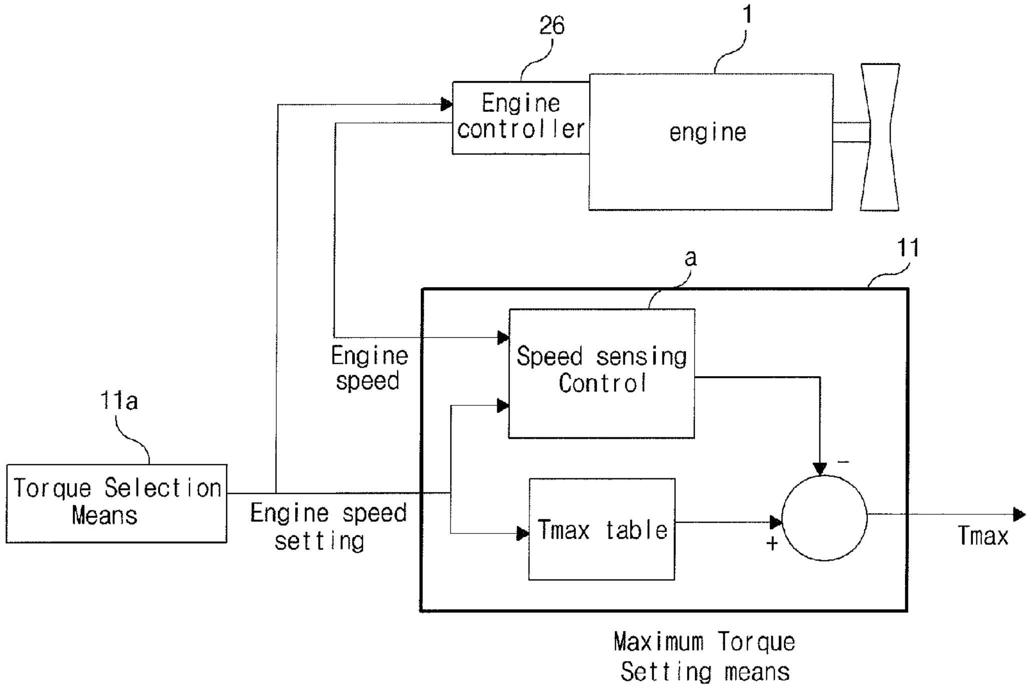
FIG. 6 is a block diagram illustrating the configuration of a torque control system in which a conventional engine speed sensing control is adopted in maximum torque setting means.

As illustrated in FIG. 6, in the case of applying the conventional engine speed sensing control a to the maximum torque setting means 11, the lowering of an initial engine speed can be prevented during urgent load of the engine 1 even if the torque matching is not achieved due to the difference in responsibility between the engine 1 and external loads, or the year elapse of the engine 1 and hydraulic pumps 2 and 3.

Figure 7:
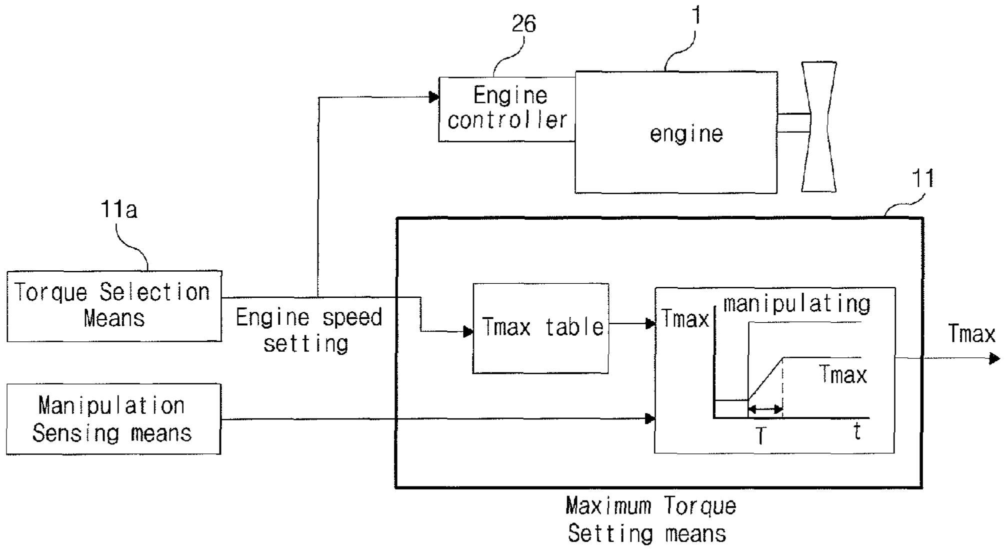
FIG. 7 is a block diagram illustrating the change of the maximum torque setting value in accordance with the manipulation.

As illustrated in FIG. 7, in the case of the urgent load of the engine 1, the transient characteristic due to the limit of the responsibility and fuel injection rate of the engine can be improved. If the control levers 7 and 8 are not manipulated, the torques of the hydraulic pumps 2 and 3 are lowered. By contrast, if the manipulation of the control levers 7 and 8 is sensed by the control lever manipulation amount sensing means 12 and 13, the torques are gradually increased up to the set Tmax. The time constant T is varied in accordance with the manipulation speed of the control levers 7 and 8 after the manipulation thereof is sensed. That is, in the case of an abrupt manipulation thereof, a large attenuation effect is secured, while in the case of a soft manipulation thereof, the initial responsibility can be guaranteed.

Figure 8:
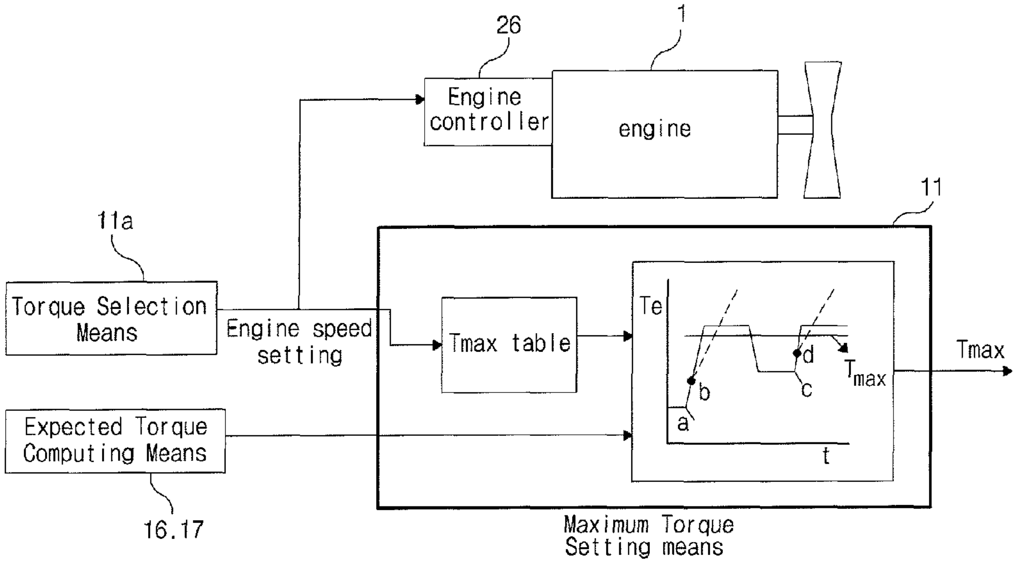
FIG. 8 is a block diagram illustrating the maximum torque limit in accordance with the change rate of the expected torque.

As illustrated in FIG. 8, in the case where the expected torque is abruptly changed, the instantaneous speed of the engine 1 is expected to be lowered, and by controlling the change rate of the whole Tmax value in accordance with the Te value, the change rate of the torques to be inputted to the hydraulic pumps 2 and 3 is controlled to prevent the instantaneous lowering of the speed of the engine 1.

That is, by making torque-limit start points b and d differ from each other in accordance with the torque sizes a and c at time points where the torques start rising after the falling torques are maintained for a specified time in accordance with the expected torque value and the expected torque change rate, and by limiting the torque change rate through the change of the torque rising slope, the output reduction due to the frequent torque limiting in a load-changing work can be minimized.

As described above, according to the system and method of controlling toque of plural variable displacement hydraulic pumps according to the embodiments of the present invention, the stability of working device against the unexpected operation thereof can be improved by limiting not only the total torque for the instantaneous torque matching with the engine but also the set torques distributed in consideration of the characteristics of the working devices designated to the respective hydraulic pumps.

Although not described in the foregoing description, if torque load caused by other additional devices acting as engine power take-off (PTO) devices is estimated or measured, it can be subtracted from the torque value set by the maximum torque setting means to achieve complete torque matching with the engine.

As described above, the system and method of controlling toque of plural variable displacement hydraulic pumps according to the embodiments of the present invention have the following advantages.

In the case of operating the plural variable displacement hydraulic pumps associated with the engine, the total amount of torque of the hydraulic pumps can be accurately limited to the preset amount of torque when the used torque of the hydraulic pumps is limited.

In the case where the sum of desired torque values of the plural hydraulic pumps is larger than a set torque value and thus it is intended to reduce the discharge flow rate of the respective hydraulic pumps, user manipulation can be maintained according to a user's intention even on the torque limit condition by reducing the flow rate of the respective hydraulic pumps in the specified ratio with respect to the desired flow rate of the respective hydraulic pumps.

The workability can be improved by suppressing the stop of engine start during the occurrence of urgent load on condition that load is generated in the plural hydraulic pumps, and the working speed can be maintained by preventing an excessive speed lowering of the engine during the occurrence of urgent load.

Unexpected generation of vibration in working devices can be suppressed even in their abrupt operation through adjustment of the change rate of the torque of the plural hydraulic pumps, and thus the manipulation thereof can be improved.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for controlling torque of plural variable displacement hydraulic pumps in construction equipment, comprising:

an engine;

at least two variable displacement hydraulic pumps associated with the engine;

hydraulic actuators associated with the hydraulic pumps, respectively, to drive working devices;

control levers generating manipulation signals corresponding to manipulation amounts to drive the hydraulic actuators, respectively;

control lever sensing means detecting the manipulation amounts of the control levers and generating detection signals;

hydraulic pump pressure sensing means detecting load pressures of the hydraulic pumps and generating detection signals;

maximum torque setting means setting the total torque inputted from the engine to the hydraulic pumps;

desired flow rate computing means computing flow rates of the hydraulic pumps corresponding to the detection signals inputted from the control lever sensing means;

expected torque computing means computing expected torque values of the hydraulic pumps in accordance with input signals from the hydraulic pump pressure sensing means and the desired flow rate computing means;

torque distributing means distributing torque values of the hydraulic pumps by proportionally reducing allowable torque values of the hydraulic pumps so that the sum of the torque values generated by the hydraulic pumps is limited to the torque value by the maximum torque setting means in accordance with input signals from the expected torque computing means and the maximum torque setting means;

limited flow rate computing means receiving the torque values of the hydraulic pumps distributed by the torque distributing means and the load pressures of the hydraulic pumps from the hydraulic pump pressure sensing means, and computing the flow rates of the hydraulic pumps so that the torque values reset in accordance with the load pressures generated by the hydraulic pumps are generated in the hydraulic pumps; and output means outputting control signals to regulators so that the hydraulic pumps are operated in accordance with the flow rates computed by the limited flow rate computing means.

2. A method of controlling torque of plural variable displacement hydraulic pumps in construction equipment including an engine, plural variable displacement hydraulic pumps associated with the engine, hydraulic actuators associated with the hydraulic pumps, control levers generating manipulation signals so as to drive the hydraulic actuators, control lever sensing means detecting the manipulation amounts of the control levers, pressure sensing means detecting load pressures of the hydraulic pumps, and torque selecting means, the method comprising:

a first step of receiving inputs of the manipulation amounts of the control levers from the control lever sensing means, the load pressures of the hydraulic pumps from the pressure sensing means, and a torque value selected by the torque selection means;

a second step of setting the total torque inputted to the hydraulic pumps in accordance with a selected value selected by the torque selection means;

a third step of computing desired flow rates of the hydraulic pumps desired in accordance with the manipulation amounts of the control levers;

a fourth step of computing expected torque values of the hydraulic pumps from the desired flow rates of the hydraulic pumps and the load pressures of the hydraulic pumps;

a fifth step of judging whether the sum of the expected torque values of the hydraulic pumps is larger than the set maximum torque value;

a sixth step of outputting the desired flow rates to the hydraulic pumps as they are if the sum of the expected torque values of the hydraulic pumps is smaller than the set maximum torque value in the fifth step; and a seventh step of outputting the desired flow rates of the hydraulic pumps reset so that the sum of the torque values of the hydraulic pumps is limited to the distributed torque values of the hydraulic pumps in accordance with load pressure conditions of the hydraulic pumps if the sum of the expected torque values of the hydraulic pumps is larger than the set maximum torque value in the fifth step.

3. The method of claim 2, wherein the seventh step proportionally reduces the respective maximum torque values of the hydraulic pumps so as to limit the torque values of the hydraulic pumps to the set maximum torque values.

4. The system of claim 1, wherein the maximum torque setting means modifies the maximum torque values by comparing an input engine speed with a set engine speed.

5. The system of claim 1, wherein the maximum torque setting means receives the expected torque values and modifies the maximum torque values so that the change rate of the sum of the distributed torque values exists within a specified range.

6. The system of claim 1, wherein the maximum torque setting means receives the input signals from the manipulation amount sensing means, and if it is judged that no manipulation amount is detected, it maintains the maximum torque value lower than the set maximum torque value, while if any manipulation amount of the control levers is detected, it modifies the maximum torque value so that the maximum torque value is gradually increased for a predetermined time.

7. The system of claim 1, wherein the torque distributing means resets the respective distributed torque values so that the change rate of the distributed torque values of the hydraulic pumps exists within a specified range.

8. The system of claim 1, wherein if the distributed torque values of the hydraulic pumps reach upper and lower threshold values of torque use of the hydraulic pumps, the torque distributing means sets the torque value of the corresponding hydraulic pump as a threshold value and transfers its variation to the remaining hydraulic pump to reset the torque value.

9. The system of claim 1, wherein pressure sensors are used as the hydraulic pump pressure sensing means.

10. The system of claim 1, wherein the maximum torque setting means includes an engine speed setting function that sets the maximum torque values of the hydraulic pumps in association with an engine speed adjusting step so as to adjust the working speed through setting of the engine speed in multi-steps.

* * * * *